(No Model.)
T. B. JEFFERY.
VELOCIPEDE.
No. 434,449. Patented Aug. 19, 1890.
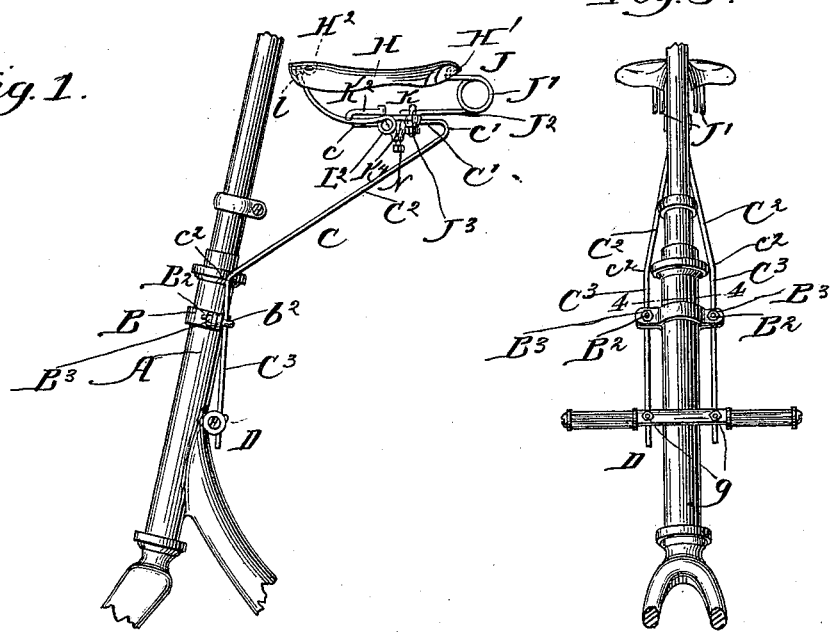
Witnesses:
Jean Elliott
Celeste P. Chapman
Inventor
Thos. B. Jeffery
By Burton & Burton
his Attorneys

UNITED STATES PATENT OFFICE.

THOMAS B. JEFFERY, OF CHICAGO, ILLINOIS.

VELOCIPEDE.

SPECIFICATION forming part of Letters Patent No. 434,449, dated August 19, 1890.

Application filed October 16, 1889. Serial No. 327,190. (No model.)

*To all whom it may concern:*

Be it known that I, THOMAS B. JEFFERY, a citizen of the United States, residing at Chicago, county of Cook, and State of Illinois, have invented certain new and useful Improvements in Velocipede-Seats, which are fully set forth in the following specification, reference being had to the accompanying drawings, forming a part thereof.

Figure 1 is a side elevation of the saddle and its support comprised in this invention, the same being shown on a portion of a bicycle-frame. Fig. 2 is a similar view of the support adapted to be secured upon a horizontal or other than a vertical portion of the bicycle-frame. Fig. 3 is a front elevation of the vertical portion of the frame and the support thereon, of the form shown in Fig. 1. Fig. 4 is a section at 4 4 on Fig. 3. Fig. 5 is a section at 5 5 on Fig. 2. Fig. 6 is a detail plan of a portion of the saddle-frame.

The saddle-support, which comprises part of this invention, is designed especially to support a child's seat on a velocipede, or a supplemental seat to be occupied by an idle rider not in position to operate the pedals. I will first describe this support independently of the saddle which is sustained upon it. To the head A, or any upright portion of the frame, when such portion is located in convenient position for the purpose, there is clamped the yoke B, whose two parts are secured together by the eyebolts $B^2 B^2$, through whose eyes $b^2 b^2$ the vertical portions $C^3 C^3$ of the seat-support C are inserted, so that the said support C can be adjusted vertically in said eyes and secured firmly at any position to which it may be thus adjusted by means of the nuts $B^3 B^3$, which at the same time clamp the yoke into the frame. Above the vertical portions $C^3 C^3$ the said support C extends obliquely rearward, said obliquely-extending portion $C^2 C^2$ preferably converging slightly, and the rod or bar which forms the part C, being at the upper portion bent forward to form the horizontal part $C'$, to which the saddle is directly attached. This support C is made of a single piece of rod folded at the middle point $c$, forming two arms diverging slightly from that point, and both arms similarly bent at $c'$ to form the oblique portion $C^2$, and at $c^2$ to form the vertical portion $C^3$, as described.

Upon the vertical portion $C^3$, below the eyes $b^2$, I secure the foot-rest D—a horizontal bar having at each end suitable cushions or stirrups for the feet—said bar being secured to the vertical portions $C^3$ of the support C by eyebolts $b^2$ in a familiar manner, which permits the bar D to be adjusted vertically on the vertical portions $C^3$ by loosening the nuts $B^3$, and resetting them when the bar is suitably adjusted.

When this support is to be connected to a horizontal or other than a vertical portion of the bicycle-frame, the yoke B will be somewhat differently constructed, as shown in Figs. 2 and 5. The lugs $D^3 D^3$, by which the two parts of the yoke are secured together, being lengthened and twisted ninety degrees, so that they have a vertical portion $d^3$, in addition to the horizontal portion through which the clamping-bolts which secure them to the frame are inserted, the vertical portion serving to receive the eyebolts through which the vertical portions $C^3$ of the support are passed, and in which they are adjusted and clamped. In either form—that is, in application to either form or position on the frame—it is important that the support C be comprised of two arms, as illustrated, so that it may be vertically adjusted, striding, if necessary, any portion of the frame which would otherwise obstruct its adjustment. The saddle which I use upon this support has a tensile seat H, secured to the back-stretcher $H'$ and the front clip $H^2$, in the usual manner, and supported upon back springs J, secured to the stretcher $H'$ at the upper end, and to the spring-frame K at the lower end. The form of this rear spring is not novel, being made of a single piece of spring-rod formed in two similar coils $J' J'$, the rod running from the coils obliquely to the back stretcher $H'$, while the middle portion of the rod runs from the coils, respectively, in two arms $J^2 J^2$, whereby the spring is clamped by means of the bolts $J^3$ to the spring-frame K, said back spring being adapted to be adjusted back and forth through the eyebolts, as may be required. The front spring is also made of a single piece of spring-rod L, bent at the middle point $l$, where it is attached to the clip $H^2$, the two branches of the rod from said bend curving downward and rearward, diverging horizontally, and at the rear portion each being formed into a spiral $L^2$, from the inner coil of which the end of the wire extends upward and is inserted through and riveted into the spring-frame K, the bosses $K'$ $K'$ being provided for that purpose. The frame K is provided with two arms $K^2$ $K^2$, extending forward, respectively, from the bosses $K'$ and overhanging and forming stops for the arms $L'$ $L'$ of the front spring, which said stops contact at a point about midway between the front and rear limits of the front springs. The spirals $L^2$ $L^2$ are preferably located approximately underneath the point of the seat whereon the greatest weight of the rider will rest. The exact position, however, is not essential; but it should not be forward of the middle to produce the best results.

The frame K, besides the means of attaching springs, as above described, has the yoke $K^4$, provided with a horizontal aperture $k^4$, through which the horizontal portion $C'$ of the support C is inserted, and wherein it is clamped by the set-screw N, forcing the clamping-bar $N'$ against said horizontal portion $C'$ on the under side and binding it between the said clamping-bar and the saddle-frame K.

It will be observed that the operation of this saddle, which results from the construction and location of the front support in connection with the tensile seat, is that when the weight of the rider rests in the more usual position on the seat—that is, at any point which will cause his weight to operate downward at the middle part of the seat—it will tend to draw or strain the upper ends of the rear and front supports toward each other, and that this strain, in respect to the front support, will be expended upon said support without any effect except the possible slight springing of the arms $L'$ between the stops H and the point of connection of the forward end of the saddle at the forward and upper end of said front support—that is, the weight so resting will not bring into operation at all the spring-coils of said front support, and that only in case the weight of the rider shall be thrown so far forward that it is exerted downward upon the forward end of the front support, which will be the case only when it is exerted so far forward that it will practically not tend to stretch the seat at all, will these coils operate as springs, and this is the intention of the structure—viz., to support the forward end of the saddle elastically with respect to weight upon it directly at the end, but approximately rigid with respect to strain rearward.

I claim—

1. In a velocipede, in combination with the frame, a supplemental seat-support secured thereto, a supplemental seat secured to such support at the upper part thereof, said support terminating downwardly in a vertically-extended portion, and a foot-rest releasably made fast at any selected point on such vertically-extended portion, substantially as set forth.

2. In a velocipede, in combination with the frame, a supplemental seat-support secured thereto, a supplemental seat secured to such support at the upper part thereof, such support terminating downwardly in two vertically-extended arms, one on each side of the vertical plane of the frame, and a foot-rest releasably secured upon said vertically-extended arms, substantially as set forth.

3. In a velocipede, in combination with the frame, a supplemental seat-support secured thereto, said support having at its upper end a portion extending approximately horizontally and at its lower end a portion extending approximately vertically, a supplemental seat releasably secured upon such horizontally-extended upper portion, and a foot-rest releasably secured upon the vertically-extended lower portion, whereby said seat and foot-rest may be adjusted relatively to each other and to the supplemental seat-support, substantially as set forth.

4. In combination with the velocipede-frame, the supplemental seat-support C, formed of metal rod folded at the middle point and bent to form the horizontal portion $C'$ at the upper end and the vertical end portions $C^3$ at the lower end, the yoke adapted to be clamped onto the frame and having the lugs by which it is so clamped provided with the horizontally-inserted eyebolts adapted to receive said vertical end portions of said support in their eyes, respectively, and the foot-rest, consisting of the bar D, having the eyebolts G, by which it is adjustably clamped on the vertical portions $C^3$ of the support, substantially as set forth.

5. In a velocipede-saddle, in combination with a tensile seat, the rear support for the same, the frame on which said rear support is fastened, a front support for the seat, secured at its rear end to said frame underneath the seat and extending forward to the front connection with the seat, such front support being elastic near its rear fastening, and the frame having stops which overhang said front supports forward of the elastic portion thereof, substantially as set forth.

6. In a velocipede-saddle, in combination with a tensile seat, the rear support for the same, the frame on which said rear support is fastened, a front spring, comprising a spiral coil having the wire from one end thereof running to and made rigid with said frame and the wire from the other end running from the upper side of the coil and constituting an arm extending forward and upward, and having the forward end of the saddle secured to its forward end, the frame in which such front spring is rigidly secured having a stop which overhangs said forward arm of the spring, substantially as set forth.

7. In a velocipede-saddle, in combination with a tensile seat, the rear support for the same, the frame on which said rear support is fastened, a front support for the seat, secured rigidly at its rear end to said frame underneath the seat and extending forward to the front connection with the seat, such front support having elastic coils near its rear rigid fastening, the said frame having stops which overhang said front support forward of said coils to restrain the reaction of the coils tending to carry the forward end of the front support upward, whereby said front support operates as a spring-support when the weight of the rider is thrown on the forward end of the saddle, substantially as set forth.

8. In a velocipede, in combination, substantially as set forth, the frame K, the tensile seat H, the rear support for such seat made fast to said frame, the front support consisting of a rod or wire bent to form two arms which extend rearward from the bend, and having the forward end of the seat connected to it at such bend, and coiled to form two spring-coils at its rear support, the ends running from said coils being rigidly secured in the frame K, said frame having stop-arms overhanging the front support forward of the coils, substantially as set forth.

In testimony whereof I have hereunto set my hand, at Chicago, Illinois, in the presence of two witnesses, this 13th day of September, 1889.

THOS. B. JEFFERY.

Witnesses:
GEO. L. WALKER,
W. H. MULLEN.